Sept. 22, 1936. B. E. QUEEN 2,055,262
GATE VALVE PACKING TOOL
Filed Sept. 10, 1935
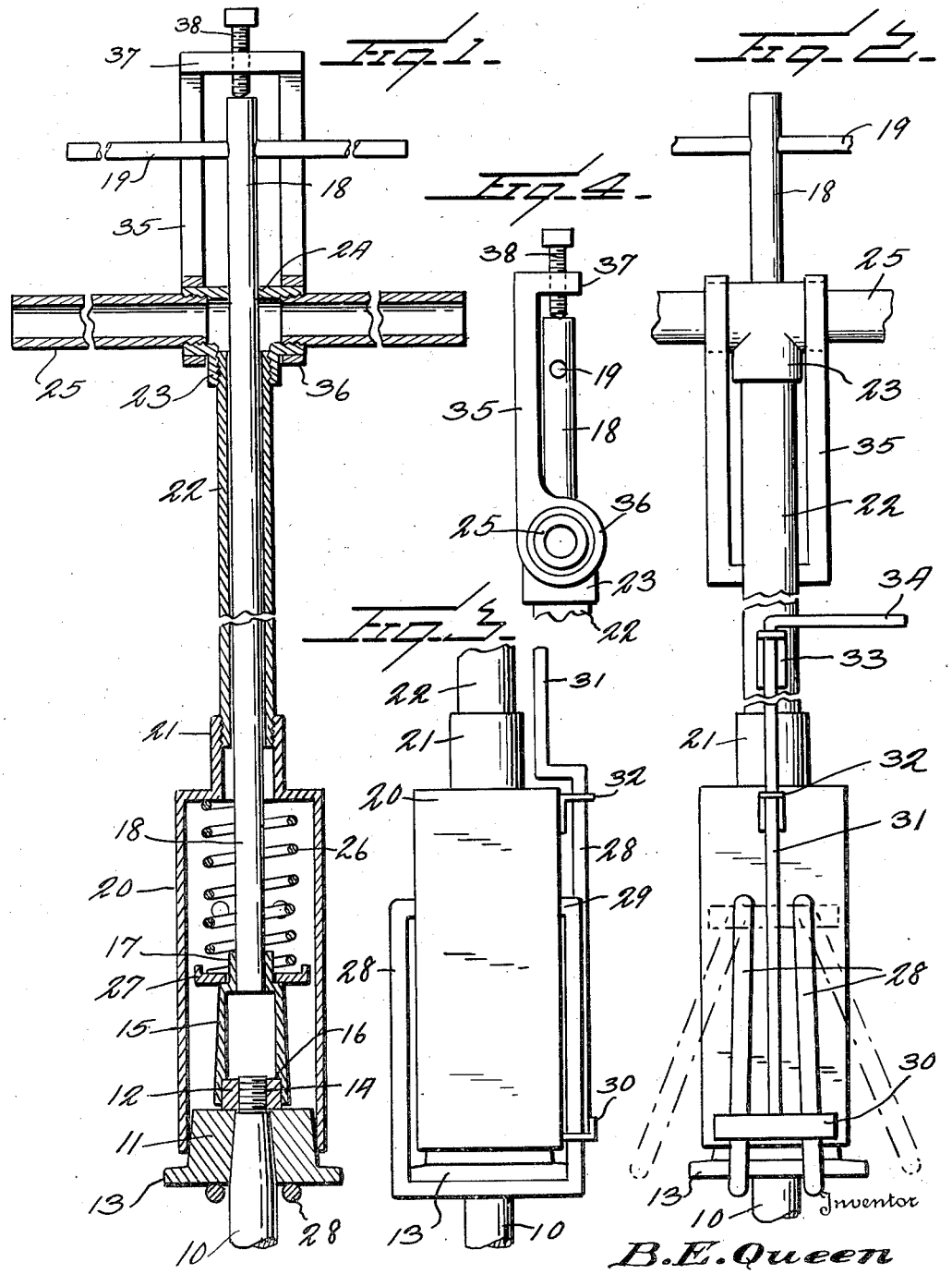

Patented Sept. 22, 1936

2,055,262

UNITED STATES PATENT OFFICE 2,055,262

GATE VALVE PACKING TOOL

Bert E. Queen, Santa Barbara, Calif., assignor of twenty per cent to Joseph Borra and twenty per cent to Ernest V. Read, Santa Barbara, Calif.

Application September 10, 1935, Serial No. 39,965

5 Claims. (Cl. 81—55)

This invention relates to nut removing tools and more particularly to a tool adapted for use in removing nuts from valve structures which are positioned in relatively confined and remote places.

An object of this invention is to provide a tool of this character which is so constructed that a valve may be readily taken apart for the purpose of repacking the valve where a valve is positioned in a confined or remote place, without making it necessary to remove the parts disposed closely adjacent the valve in order to get at the nuts on the valve stem or the valve housing to take the valve apart and subsequently put the valve together again.

Another object of this invention is to provide a tool of this kind which is so constructed that the parts removed by the tool will be firmly gripped by the tool so that they may be removed from the confined place in which the valve is situated without dropping the removed parts.

A still further object of this invention is to provide a tool of this character which embodies relatively few parts so that the device can be made at a small cost and will not readily get out of order.

The above and various other objects and advantages of this invention will in part be described in, and in part be understood from the following detail description of the present preferred embodiment, the same being illustrated in the accompanying drawing wherein:—

Figure 1 is a longitudinal section partly broken away of a device constructed according to an embodiment of this invention.

Figure 2 is a detail side elevation of the device, the device being partly broken away.

Figure 3 is a fragmentary enlarged front elevation of the device.

Figure 4 is a fragmentary side elevation of the nut pulling means incorporated in this device.

Referring to the drawing wherein like numerals of reference designate corresponding parts throughout the several views, the numeral 10 designates generally a valve stem connected to a gate valve which is provided with an operating nut 11 secured to the stem 10 and provided with a marginal flange 13. The operating nut 11 is locked by means of a lock nut 12 engaging the reduced portion 14 of the stem 10. This construction is conventional construction and the gate valve structure is only here shown fragmentarily.

In order to provide a means whereby the lock nut 12 or the operating nut 11, or both of these nuts, may be removed and replaced so as to permit repacking of the valve, particularly where the valve associated with the stem 10 and operating nut 11 may be removed and replaced so as to permit repair of the valve or repacking of the valve structure, I have provided a socket 15 which has a shoulder 16 adjacent its lower portion which is adapted to engage about the faces of the nut 12. The nut 12 is adapted to be received within the socket 15 and the upper end of the socket 15 is reduced, as at 17, and is secured to an elongated lock nut operating rod 18 of a suitable length which is provided at its upper end with a transversely extending handle 19.

In order to provide a means whereby the operating nut 11 may be held against rotation while the lock nut 12 is being loosened or tightened, I have provided a second or outer socket 20 which at its lower end, is adapted to engage about the operating nut 11 and which, at its upper end, is provided with reduced sleeve or upper end portions 21. This reduced socket portion 21 is threaded onto the lower end of a tubular operating member 22, extending loosely about the rod 18 and of a length substantially shorter than the length of the rod 18. The tubular operating member 22 at its upper end is provided with a T 23 having an opening 24 through which the rod 18 projects. Laterally extending handles 25 are secured to opposite portions of the T 23.

The operating rod 18 is slidable and rotatable within the pipe or hollow operating member 22 and in order to provide a means whereby the inner socket 15 may be maintained in contact with the lock nut 12, I have provided an expanding spring 26 which is disposed within the outer socket 20 and which, at its lower end, engages a washer 27 mounted on the upper end of the inner socket member 15.

The tool comprising the two socket members 15 and 20 and the two operating members 18 and 22 with the associated handles are held with the sockets 15 and 20 engaging the nuts 12 and 11 respectively, by means of a pair of U-shaped locking arms 28, each of which is provided with inwardly extending trunnions 29 on the free legs thereof which swingably engage in openings provided in the socket 20 above the lower end thereof. A looped strap or clamp operating member 30 engages adjacent arms of the locking members 28 and the operating member 30 is moved by means of an elongated rod 31 which is slidable in guides 32 and 33. These guides 32 and 33 are secured to the socket 20 and the hollow operating member 22 respectively.

The upper end of the operating rod 31 terminates in a lateral extension 34 providing a handle by means of which the clamp operating member 30 may be raised or lowered so as to either spread the clamping members 28 apart to released position or to draw these members together into clamping position beneath the flange 13 of the operating nut 11. Preferably, these clamping members 28 are disposed when in clamping position in upwardly convergent relation so that upward movement of the operating member 30 will cause the clamping members 28 to move apart a distance sufficient to permit the bight of these members to pass the flange 13.

In the event that the socket member 20 sticks unduly on the nut 11, the tool may be released from the nut 11 by means of a pulling device including a U-shaped member 35 provided with eyes 36 on the free legs thereof which rotatably engage the laterally projecting portions of the T 23. Preferably, the bight of the U-shaped member 35 has a laterally extending portion 37 in which a threaded pulling member 38 is disposed, this pulling member 38 being in the form of a set screw or bolt.

In the use and operation of this device, the outer socket 20 is engaged with the operating nut 11 and the inner socket 15 engaged with the lock nut 12. When the outer socket 20 has been pressed onto the nut 11, the handle 34 which is initially in an upper position so as to hold the clamping members 28 in open position is then lowered so that the clamp operating member 30 will be lowered to pull the clamping members 28 into a clamping position beneath the flange 13 of the nut 11.

The spring 26 will constantly urge the socket 15 into an engaging position and when the clamping members 28 are in clamped position, one of the handles 25 may be held with one hand and one of the handles 19 may be grasped with the other hand and the inner socket 15 then turned so as to rotate the nut 12. This rotation may be either to loosen or tighten the nut 12.

When the operation has been completed as to the nut 12, the handle 34 may then be raised so as to spread the clamping members 28 apart whereupon the handles 25 may be grasped and the entire tool removed.

In the event, however, that the socket 20 sticks unduly onto the nut 11, the tool may be released from the nut 11 by swinging the clevis 35 upwardly until the threaded pulling member 38 overlies the upper end of the inner operating rod 18. This member 38 may be then turned inwardly which will cause the tubular member 22 to be moved outwardly relative to the operating member 18.

It will be obvious that an exceedingly simple tool has been disclosed which can be used to repair gate valves irrespective of whether the gate valves are in a confined or open place. These gate valves are frequently placed in underground passages in a position where the valves are not readily accessible for repair and are usually operated by means of an elongated rod having a socket at one end and a handle at the other end. By means of this tool the valve can be repacked or otherwise repaired without digging a relatively large hole about the valve, it being only necessary that a sufficiently large opening be provided to receive the clamping members 28 and the socket 20. The operating members 18 and 22 may be of any desired length, depending only on the accessibility of the valve.

I claim:—

1. A tool as set forth comprising an outer socket, a tube secured at one end to the outer socket, a handle secured to the other end of the tube, an inner socket disposed within the outer socket, a rod secured at one end to the inner socket and extending longitudinally through the tube and projecting above the upper end of the tube, a spring disposed within the outer socket and engaging the inner socket to constantly urge the inner socket into engagement with a nut, a pulling member carried by the upper end of the tube and means carried by the pulling member and engageable with the rod to move the outer socket longitudinally of the inner socket.

2. A tool as set forth comprising an outer socket, a tube secured at one end to the outer socket, a handle secured to the other end of the tube, an inner socket within the outer socket, a rod secured at one end to the inner socket and extending longitudinally through the tube and projecting beyond the other end of the tube, yieldable means within the outer socket engaging the inner socket constantly urging the inner socket outwardly of the outer socket, a pulling means, means for swingably mounting the pulling means on the other end of the tube, and means carried by the pulling means engageable with the upper end of the rod to move the rod longitudinally of the outer socket whereby to withdraw the outer socket from a nut.

3. A tool as set forth comprising an outer socket, a tube secured at its lower end to the outer socket, a handle secured to the upper end of the tube, an inner socket, a rod secured at its lower end to the inner socket and extending through and beyond the upper end of the tube, a pair of clamping members, means for swingably mounting the clamping members on the outer socket whereby to detachably clamp the outer socket onto a nut, operating means for the clamping members extending longitudinally of the tube and pulling means carried by the upper end of the tube and engageable with the rod to move the outer socket relative to the inner socket.

4. A tool as set forth comprising an outer socket, a tube secured at one end to the outer socket, a handle secured to the other end of the tube, an inner socket within the outer socket, an elongated rod secured at one end to the inner socket and extending through and beyond the other end of the tube, a handle on the other end of the rod, a pair of clamping members, means for swingably mounting the clamping members on the outer socket to detachably secure the outer socket onto a nut, a slide engaging the clamping members to move the clamping members to inoperative or operative position, an elongated slide operating member extending longitudinally of the tube, means for slidably mounting the elongated operating member on the tube, a pulling member, means for mounting the pulling member on the tube for movement to operative or inoperative position, and means carried by the pulling member for engagement with the rod to move the rod relative to the tubular member.

5. A tool as set forth comprising an outer socket, a tube secured at one end to the outer socket, a handle secured at the other end of the tube, an inner socket within the outer socket, an elongated rod secured at one end to the inner socket and extending through and beyond the other end of the rod, a pair of clamping members, means for swingably mounting the clamping members on the outer socket to detachably secure the outer socket on to a nut, a slide engaging the clamping members to move the clamping members to inoperative or operative position, an elongated slide operating member extending longitudinally of the tube, and means for slidably mounting the elongated operating member on the tube.

BERT E. QUEEN.